United States Patent
Beller et al.

(10) Patent No.: US 11,354,920 B2
(45) Date of Patent: Jun. 7, 2022

(54) UPDATING AND IMPLEMENTING A DOCUMENT FROM AN AUDIO PROCEEDING

(71) Applicant: International Business Machines Corporation, Armonk, NY (US)

(72) Inventors: Charles E. Beller, Baltimore, MD (US); Akanksha Joshi, Pune (IN); Hemant Kumar Sivaswamy, Pune (IN); Sunil Nambiar, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 16/600,475

(22) Filed: Oct. 12, 2019

(65) Prior Publication Data
US 2021/0110154 A1    Apr. 15, 2021

(51) Int. Cl.
*G06V 30/418* (2022.01)
*G06F 16/31* (2019.01)
(Continued)

(52) U.S. Cl.
CPC .......... *G06V 30/418* (2022.01); *G06F 16/328* (2019.01); *G06F 40/226* (2020.01);
(Continued)

(58) Field of Classification Search
CPC ...... G06F 16/328; G06F 16/36; G06F 40/226; G06F 40/279; G06F 40/197; G06F 40/30;
(Continued)

(56) References Cited

U.S. PATENT DOCUMENTS

| 7,424,427 B2 | 9/2008 | Liu et al. |
| 8,140,338 B2 | 3/2012 | Grobauer |

(Continued)

FOREIGN PATENT DOCUMENTS

| CN | 101290628 B | 6/2010 |
| CN | 101326533 B | 5/2013 |

(Continued)

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Chau T Nguyen
(74) *Attorney, Agent, or Firm* — Law Office of Jim Boice (57) ABSTRACT

A method modifies and utilizes a text document based on an audio file that has captured audio proceedings relevant to the text document. One or more processors and/or a user segment the text document into topic-based text segments. Processor(s) receive an audio file that is relevant to the text document, convert the audio file into text, and match a specific topic-based text segment from the topic-based text segments to a specific topic-based audio segment from the topic-based audio segments. In response to identifying a difference between content in the specific topic-based text segment and content in the specific topic-based audio segment, processor(s) and/or the user update the specific topic-based text segment with the content in the specific topic-based audio segment to create an updated version of the text document.

20 Claims, 6 Drawing Sheets

(51) Int. Cl.
  *G06K 9/62* (2022.01)
  *G10L 15/26* (2006.01)
  *G06F 40/226* (2020.01)
  *G06F 40/279* (2020.01)

(52) U.S. Cl.
  CPC ......... *G06F 40/279* (2020.01); *G06K 9/6215* (2013.01); *G06K 9/6263* (2013.01); *G10L 15/26* (2013.01)

(58) Field of Classification Search
  CPC .... G06K 9/6215; G06K 9/6263; G10L 15/26; G06V 30/418
  See application file for complete search history.

(56) References Cited

U.S. PATENT DOCUMENTS

| | | | |
|---|---|---|---|
| 8,364,489 B2 | 1/2013 | Grobauer | |
| 8,612,231 B2 | 12/2013 | Grobauer | |
| 9,484,033 B2 | 11/2016 | Bufe et al. | |
| 10,140,973 B1* | 11/2018 | Dalmia | G10L 15/26 |
| 10,146,789 B1* | 12/2018 | Lakshmanan | G06F 16/178 |
| 10,657,954 B2* | 5/2020 | Mertens | G06F 16/638 |
| 10,789,956 B1* | 9/2020 | Dube | G10L 13/00 |
| 2007/0106508 A1* | 5/2007 | Kahn | G10L 15/22 704/E15.04 |
| 2012/0310642 A1* | 12/2012 | Cao | G10L 15/26 704/235 |
| 2013/0275429 A1 | 10/2013 | York et al. | |
| 2018/0315429 A1 | 11/2018 | Taple et al. | |
| 2020/0342138 A1* | 10/2020 | Ju | G06F 40/295 |

FOREIGN PATENT DOCUMENTS

| | | |
|---|---|---|
| CN | 108984529 A | 12/2018 |
| CN | 109858005 A | 6/2019 |
| CN | 105895085 B | 10/2019 |
| EP | 1960943 | 8/2008 |
| JP | 2009518729 | 5/2009 |
| WO | 2007066246 | 6/2007 |

OTHER PUBLICATIONS

Ciro Gracia et al., "Legal Knowledge Acquisition and Multimedia Applications", International Workshop on Knowledge Acquisition From Multimedia Content, N. 14, 2007, pp. 1-15.

Sonocent Ltd., "Audio Notetaker", Sonocent Ltd., <https://sonocent.com/audio-notetaker/>, Retrieved on Jul. 29, 2019, pp. 1-8.

Cogi, Inc., "Cogi Online Transcription Services for Automated Note Taking", <https://www.cogi.com/>, Retrieved on Jul. 29, 2019, pp. 1-5.

Ido Dagan et al., "Recognizing Textual Entailment: Rational, Evaluation and Approaches", Natural Language Engineering, 15(4), Cambridge University Press, 2009, p. i-xvii (pp. 1-17).

Elasticsearch B.V. "Reindexing Your Data", Elasticsearch B. V., Elasticsearch: The Definitive Guide [2.X], <https://www.elastic.co/>, Retrieved Jul. 29, 2019, pp. 1-5.

Guillermo Perez Farquharson, "Elasticsearch With Realtime Ingestion", Elasticsearch B.V., <https://www.discuss.elastic.co/>, Retrieved Jul. 29, 2019, pp. 1-3.

PCT International Search Report (ISR) and Written Opinion (WO), dated Jan. 27, 2021.

* cited by examiner

UPDATING AND IMPLEMENTING A DOCUMENT FROM AN AUDIO PROCEEDING

BACKGROUND

The present invention relates to the field of documents that are updated by audio recordings of related proceedings. Still more specifically, the present invention relates to the field of updating documents that are used to control a device based on an audio file of an audio proceeding.

SUMMARY

In an embodiment of the present invention, a method modifies and utilizes a text document based on an audio file that has captured audio proceedings about a device that the text document controls. One or more processors and/or a user segment a text document into topic-based text segments, where the text document controls an operation of a device. Processor(s) receive an audio file that is relevant to the text document, and convert the audio file into text to create a text representation of the audio file. Processor(s) and/or the user segment the text representation of the audio file into topic-based audio segments, and then match a specific topic-based text segment from the topic-based text segments to a specific topic-based audio segment from the topic-based audio segments, where the specific topic-based text segment from the topic-based text segments and the specific topic-based audio segment from the topic-based audio segments are of a same topic. Processor(s) and/or the user identify a difference between content in the specific topic-based text segment and content in the specific topic-based audio segment, and determine that novelty criteria are met by the specific topic-based audio segment based on the difference between the content in the specific topic-based text segment and the content in the specific topic-based audio segment. In response to identifying the difference between the content in the specific topic-based text segment and the content in the specific topic-based audio segment, and in response to determining that the novelty criteria are met by the specific topic-based audio segment, processor(s) and/or the user update the content in the specific topic-based text segment with the content in the specific topic-based audio segment to create an updated version of the text document. Processor(s) and/or the user then utilize the updated version of the text document to perform an action that modifies the operation of the device.

In one or more embodiments, the method(s) described herein are performed by an execution of a computer program product and/or a computer system.

DETAILED DESCRIPTION

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

Figure 1:
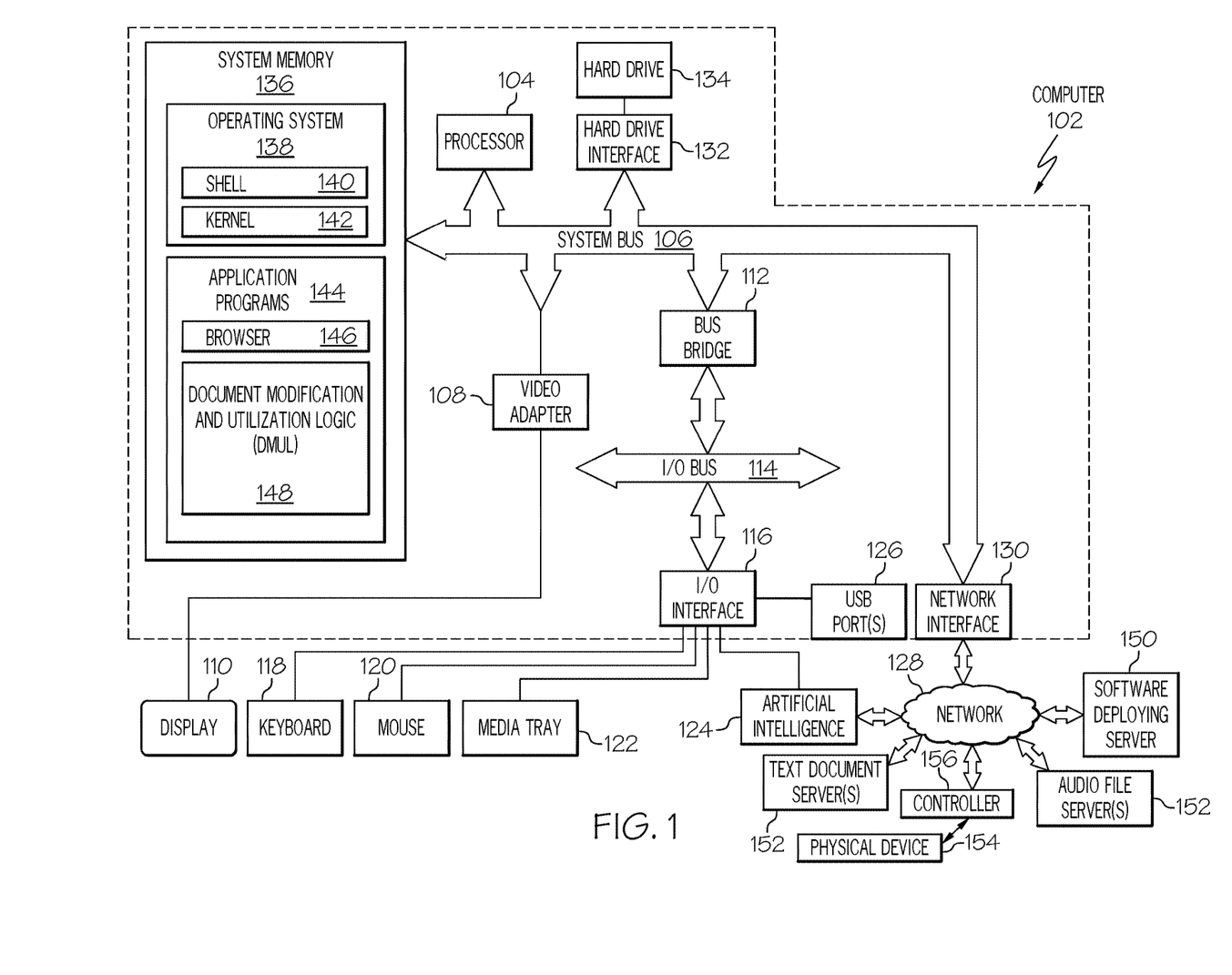
FIG. 1 depicts an exemplary system and network in which the present invention is implemented in various embodiments.

With reference now to the figures, and in particular to FIG. 1, there is depicted a block diagram of an exemplary system and network that can be utilized by and/or in the implementation of the present invention. Note that some or all of the exemplary architecture, including both depicted hardware and software, shown for and within computer 102 can be utilized by artificial intelligence 124 and/or software deploying server 150 and/or text document server(s) 152 and/or physical device 154 and/or controller 156 and/or audio file server(s) 158 shown in FIG. 1, and/or Text Updating and Utilization Logic (TUUL) 202 shown in FIG. 2, and/or one or more of the neurons/nodes shown in the deep neural network 324 depicted in FIG. 3.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), an artificial intelligence 124, and external USB port(s) 126. While the format of the ports connected to I/O interface 116 can be any known to those skilled in the art of computer architecture, in one embodiment some or all of these ports are universal serial bus (USB) ports.

As depicted, computer 102 is also able to communicate with artificial intelligence 124 and/or software deploying server 150 and/or text document server(s) 152 and/or physical device 154 (via controller 156) and/or audio file server(s) 158 using a network interface 130 to a network 128. Network interface 130 is a hardware network interface, such as a network interface card (NIC), etc. Network 128 can be an external network such as the Internet, or an internal network such as an Ethernet or a virtual private network (VPN). One or more examples of physical device 154 are presented below.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Document Modification and Utilization Logic (DMUL) 148. DMUL 148 includes code for implementing the processes described below, including those described in FIGS. 2-4. In one embodiment, computer 102 is able to download DMUL 148 from software deploying server 150, including in an on-demand basis, wherein the code in DMUL 148 is not downloaded until needed for execution. Note further that, in one embodiment of the present invention, software deploying server 150 performs all of the functions associated with the present invention (including execution of DMUL 148), thus freeing computer 102 from having to use its own internal computing resources to execute DMUL 148.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

Text documents, such as source code listings, meeting transcripts, operating manuals for equipment, etc. are often quite lengthy. Updating such text documents manually is a time consuming and error prone endeavor. Furthermore, if changes are based on subsequent oral conversations, there is currently no useful way of incorporating such oral changes into an appropriate text document. Thus, one or more embodiments of the present invention quickly and/or automatically add updates from an oral proceeding (e.g., from an audio recording of the oral proceeding) to update the text document.

As such, one or more embodiments of the present invention update a text document from audio recordings of a proceeding by 1) ingesting the text document. This process is performed by: segmenting the text document into small units (e.g., pages or paragraphs about a particular subject); analyzing the small units for topic and keyword information; and indexing the analyzed document within a search engine.

The system 2) identifies candidate updates by: tracking the audio proceedings after converting the audio proceedings using a Speech To Text (STT) program; storing a window of transcribed speech (e.g., 1-2 utterances) to create a candidate update; and analyzing the candidate update for topic/keywords.

The system 3) determines if the candidate update is relevant/important enough to update the document. In one or more embodiments of the present invention, the overall update score is a combination of a) speaker importance and a b) content specific score.

The a) speaker importance is determined by a role of the speaker. For example, if a meeting is about changes to software that controls a particular piece of equipment, then a meeting participant who is an operator or engineer responsible for that particular piece of equipment is ranked higher in importance than another meeting participant who is unfamiliar with and/or never operates that particular piece of equipment.

In an embodiment of the present invention, the identity and/or role of the speaker is determined using voice and/or facial recognition together with identity: role matching. For example, if the audio file is part of an audio/visual file, then facial recognition of the speaker is used by applying any known facial recognition system that maps facial points to a database of known persons, etc. Similarly, if the audio file is just an audio file, then speaker recognition is achieved by comparing an audio clip of the speaker (e.g., using a Fast Fourier Transform—FFT that creates a digital file of the words of the speaker) to a database of similar words spoken by known speakers, thereby identifying the particular speaker.

The b) content score is used to identify language within the candidate update for inherent importance. For example, spoken language during a meeting such as "Change the operation of the particular piece of equipment" will be scored higher than "Shall we order lunch?"

If different passages are about different topics, then the importance of the speaker will often change as well. That is, an engineer speaking about operating a particular piece of equipment will be ranked/scored over an accountant when discussing operations of that particular piece of equipment, but that accountant will be ranked/scored over that engineer if the topic is about changing pricing terms of a contract to purchase/maintain that particular piece of equipment.

In one or more embodiments of the present invention, an update score for a particular text passage is a speaker-weighted version of the content_score:

$$update\_score = speaker\_importance * content\_score$$

That is, the decision to update a particular passage in the original text document is based on a combination of the importance of the speaker from the audio file with regard to the subject of the passage in the text document being considered for alteration, and the importance of the content in that particular passage. For example, if the speaker is scored as being unimportant with regard to the particular passage from the text document, then the system will disregard anything that he/she says about that particular passage. Similarly, if the particular passage itself is scored as being unimportant (e.g., general marketing information in operator manual, source code that does not affect the operation of a particular piece of equipment, etc.), then it will not be altered. However, if a product of the speaker importance and content score are high enough, then the passage from the text document will be amended/updated.

Thus, if a production operator makes a verbal recommendation at a meeting to change the operating parameters of a device (speaker_importance), and those changes to the operating parameters will greatly impact on how that device functions (content_score), then the changes will be made due to a high update_score.

As such, a candidate update's update_score can be used to automatically trigger updates if it is high enough (above a threshold), or it can be vetted by a human to decide to push through the update. If the update decision is made, then the system will identify a candidate update for a relevant section from the text document. Otherwise, the candidate update is discarded and system processing reverts back to the step of 2) of identifying candidate updates.

The system 4) identifies relevant sections in the text document by: generating a search query based on the analyzed candidate update; submitting the query to the search index; retrieving relevant paragraphs (small units) from the index (passage search); and presenting the retrieved paragraphs to the document updater (automatic module or human user). That is, each section (sub-unit) of the text document is identified according to the subject matter of each section, so that it can be matched to a scored passage from the audio file that was spoken by a particular participant to the proceedings.

The system then 5) updates and re-indexes the text document by: selecting a section for updating with the content (automatically based on the confidence update scores described above or by a user's manual selection); comparing the new content with the selected section to see if it represents new information; if new information is present, adding the content to that section; and updating the index for that section with the added content (re-index). That is, once relevant content from the audio file is identified for updating a particular passage in the text document, that relevant content is used to modify that particular passage, and the text document is reindexed to show the location of the modification.

Thus, the system selects a section of the text document for updating with the content based on the confidence/update score. The system compares the new content (from the audio file) with the selected section (from the text document) to see if it represents new information, using techniques such as contextual analysis of the selected section, topic/phrase detection, etc., in order to generate an information novelty score for meeting novelty criteria (i.e., does the new information provide significantly different data and is the significantly different data important?). If new information is present in the audio file, then it is added to the selected section. This content inclusion/update is automatic if the update score describe above is greater than a predefined threshold value. The index of the text document is updated for that selected section. In an embodiment of the present invention, the index not only shows which passages of the text document have been updated, but also shows the new content (from the audio file) in the index as well.

As such, one or more embodiments of the present invention determine if a candidate update from the audio file should result in a modification of a document; compare candidate updates to relevant document sections to identify if it is new information; update and/or modify relevant document sections with only novel information from candidate update; and/or modify/re-index the text document in real time if the text document is modified.

Figure 2:
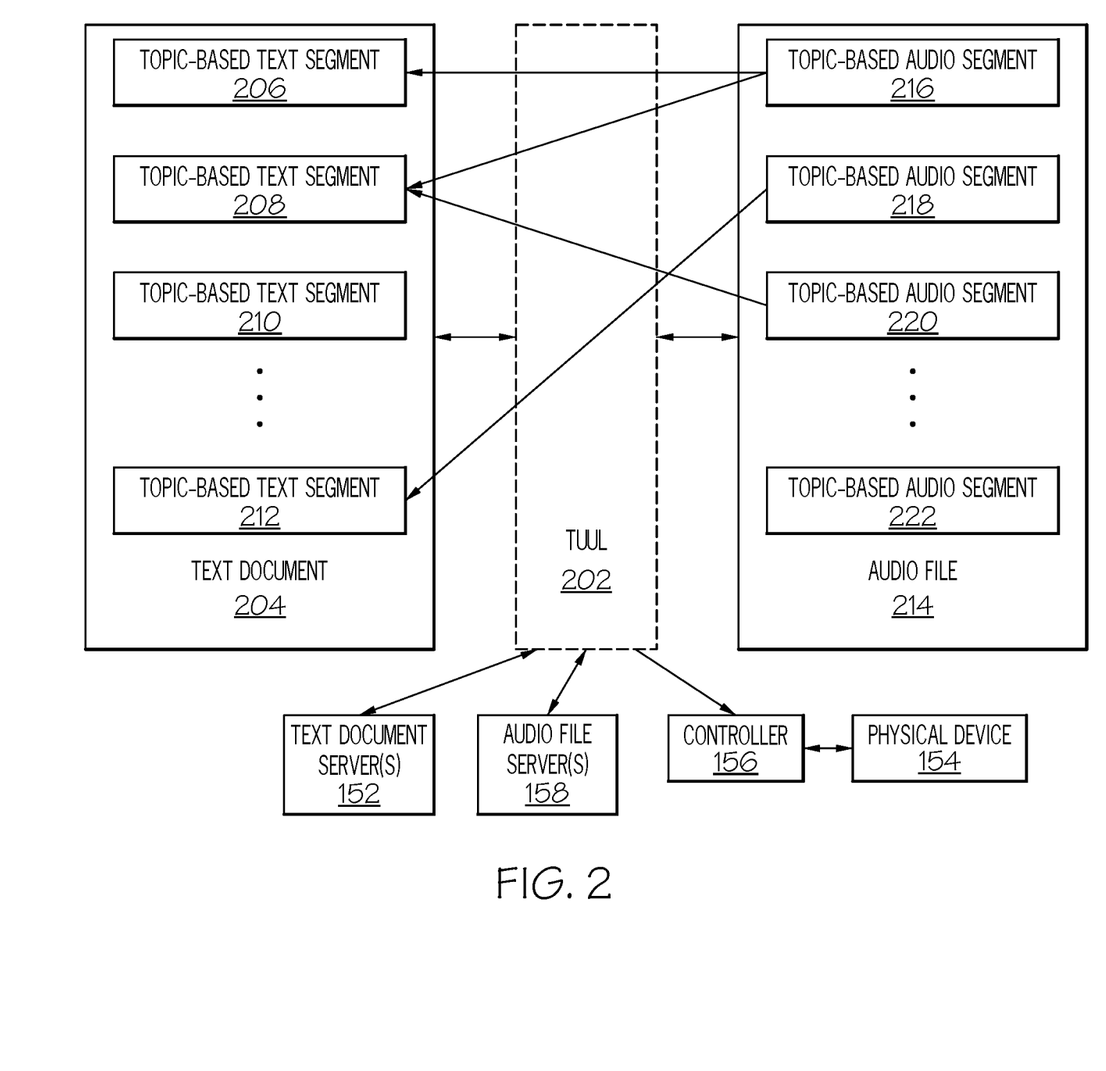
FIG. 2 illustrates a high-level overview of one or more components of the present invention.

With reference now to FIG. 2, a high level overview of one or more components of the present invention is presented.

As shown in FIG. 2, a Text Updating and Utilization Logic (TUUL) 202 (e.g., computer 102 shown in FIG. 1) receives a text document 204 from the text document server(s) 152 introduced in FIG. 1. The TUUL 202 segments the text document 204 into multiple topic-based text segments, including topic-based text segment 206, topic-based text segment 208, topic-based text segment 210, and topic-based text segment 212. It is understood that while four topic-based text segments are depicted for illustration purposes, the number of topic-based text segments can be greater or fewer than four.

In a first embodiment of the present invention, the TUUL 202 initially divides the text document 204 into multiple text segments, and then later determines the topic/subject of each text segment.

In a second embodiment of the present invention, the TUUL 202 examines a section of text to determine the context/content/subject of the section, and continues adding subsequent passages of the same context/content/subject to that section.

That is, in the second embodiment, the TUUL 202 identifies a certain passage as being related to a particular subject (e.g., using keyword identification, natural language processing, etc.) of that certain passage. Thereafter, follow-on passages that come immediately after that certain passage are evaluated to determine if they are about the same subject. If so, then these follow-on passages are included in the certain passage that was first identified.

However, in the first embodiment, the TUUL 202 first partitions the text document 204 into segments of a predefined nature (e.g., sentences, paragraphs, chapters, etc.), and then determines the subject/topic of each of the segments. Segments related to a same subject/topic are then aggregated so that a global change/amendment to the related segments can be made by the TUUL 202.

In a third embodiment, the present invention utilizes a combination of the first embodiment and the second embodiment in order to 1) combine follow-on passages about a same subject, and to 2) correlate each combined passage and other passages together under a same subject, thus making the correlated passages candidates for being updated by the content from the audio file 214.

The TUUL 202 then retrieves an audio file 214 from the audio file server(s) 158 shown in FIG. 1, and segments the audio file 214 into topic-based audio segment 216, topic-based audio segment 218, topic-based audio segment 220, and topic-based audio segment 222.

As with the text segments from the text document 204 described above, it is understood that while four topic-based audio segments are depicted for illustration purposes, the number of topic-based audio segments can be greater or fewer than four.

Similar to the process described for partitioning the text document 204 into multiple text segments, the audio file 214 is divided into multiple audio segments according to their topics, follow-on audio passages, predetermined sizes of audio passages, etc., based on their subjects/topics.

However, before the audio file 214 is segmented, it is first converted into a text file (e.g., using a speech to text conversion process). Thus, each of the topic-based audio segments shown as part of audio file 214 are actually text conversions of the audio passages. As such, the TUUL 202 partitions these text versions of the audio file 214 into segments of a predefined nature (e.g., sentences, paragraphs, chapters, etc.), and then determines the subject/topic of each of the segments. Segments related to a same subject/topic are then aggregated so that a global change/amendment to the related segments can be made by the TUUL 202.

As with the segmentation of the text document 204, the text conversions of the audio file 214 can combine follow-on passages about a same subject, and/or correlate each combined passage and other passages together under a same subject, thus making the correlated audio passages candidates for updating text segments in the text document 204.

In an embodiment of the present invention, various audio segments are associated with certain text segments based not just on their positions within the respective audio file 214 and text document 204, but rather based on their matching topics, relevance, importance, etc., as described above.

For example, assume that topic-based text segment 206 is text (e.g., source code, from an operation manual, etc.) that is related to controlling Device A; that topic-based text segment 208 is text that is related to controlling Device B; that topic-based text segment 210 is stock description language that describes a size, color, etc. of Device A and/or Device B; and topic-based text segment 212 describes a monetary cost of Device A and/or Device B.

Assume further, for purposes of illustration (and not for limiting the scope of the present invention), that topic-based audio segment 216 is a text conversion of an oral statement by Person W (e.g., a first operator or design engineer) during a proceeding/meeting about how to control Device A and Device B; that topic-based audio segment 218 is a text conversion of an oral statement by Person X (e.g., an accountant) about the cost of Device A; topic-based audio segment 220 is a text conversion of an oral statement by Person Y (e.g., a second operator or design engineer) about how to control Device B; and topic-based audio segment 222 is a text conversion of an oral statement by Person Z asking where parties (to a meeting/proceeding in which the audio file 214 was first captured) would like to go to lunch.

Assume further that TUUL 202 has determined that topic-based audio segment 216 and topic-based text segment 206 as well as the topic-based text segment 208 are related to the same subject/topic (i.e., controlling Device A and/or Device B). As such, TUUL 202 will determine that topic-based audio segment 216 is a candidate for modifying the topic-based text segment 206 as well as the topic-based text segment 208, depending on the role of Person W and the importance of topic-based text segment 206 and/or topic-based text segment 208 and/or topic-based audio segment 216, as discussed herein.

Similarly, TUUL 202 will determine whether topic-based audio segment 218 is a worthy candidate for modifying topic-based text segment 212 (based on topic-based audio segment 218 and topic-based text segment 212 both being relevant to the cost of Device A and/or Device B).

Similarly, if topic-based audio segment 220 and topic-based text segment 208 are both directed to controlling Device B, then TUUL 202 will determine that topic-based audio segment 220 is a good candidate for updating the topic-based text segment 208, assuming that novelty criteria are met (i.e., the changes are worthwhile, the level of change being proposed, the importance of the change when modifying the operation of Device B, the role/reputation of Person Y, etc.)

Topic-based text segment 210 will not be a candidate for modification, since stock description language about a size, color, etc. of Device A and/or Device B should never be changed.

Topic-based audio segment 222 is not a candidate for modifying any text segment in text document 204, since asking persons in a meeting where they would like to go to lunch is not relevant to the content of the text document 204.

Assume now that TUUL 202 has determined, based on the role of the speakers, the significance of the text segments, the significance of the spoken audio segments, etc., that topic-based text segment 206 is to be modified by the content of the topic-based audio segment 216, since the content in the topic-based audio segment 216 is different from that currently found in topic-based text segment 206. For example, assume that Device A is a unit of rotating equipment, and that Person W said, in a meeting after text document 204 was generated, "Device A is to speed up its nominal operating speed from 2000 revolutions per minute (RPM) to 2500 RPMs". As such, TUUL 202 which has determined that topic-based text segment 206 and topic-based audio segment 216 are both about operating parameters of Device A, will automatically modify topic-based text segment 206 to change "2000 RPMs" to "2500 RPMs". If text document 204 is an operation manual for Device A, then this change is made therein as a reference for the operator of Device A. However, if text document 204 is source code that is used by controller 156 to control the operation of Device A (e.g., physical device 154), then TUUL 202 identifies (e.g., from comments in the source code, source code known to TUUL as being related to controlling operational speeds, etc.) the appropriate source code in text document 204 for altering the operation of Device A, and automatically modifies this portion of the source code.

Similar interactions/evaluations/modifications are selectively made by TUUL 202 to topic-based text segment 208 and/or topic-based text segment 212 using new information (i.e., different from what is already in topic-based text segment 208 and/or topic-based text segment 212) taken respectively from topic-based audio segment 216 and/or topic-based audio segment 220 (for topic-based text segment 208), and/or topic-based audio segment 218 (for topic-based text segment 212).

In one or more embodiments of the present invention, TUUL 202 uses natural language processing (NLP) and/or machine learning (ML) to determine which, if any, text segments from the text document 204 are to be modified by one or more of the audio segments in the audio file 214 shown in FIG. 2.

In one or more embodiments of the present invention, TUUL 202 uses the artificial intelligence 124 shown in FIG. 1 to determine which, if any, text segments from the text document 204 are to be modified by one or more of the audio segments in the audio file 214 shown in FIG. 2.

In one or more embodiments of the present invention, artificial intelligence 124 utilizes an electronic neural network architecture, such as that found in a Deep Neural Network (DNN) or a Convolutional Neural Network (CNN).

In a preferred embodiment, a Deep Neural Network (DNN) is used to evaluate text/numeric data in a document from a text corpus received from text document server(s) 152, while a CNN is used to evaluate an image from an image corpus.

A CNN is similar to a DNN in that both utilize interconnected electronic neurons. However, a CNN is different from a DNN in that 1) a CNN has neural layers whose sizes are based on filter sizes, stride values, padding values, etc., and 2) a CNN utilizes a convolution scheme to analyze image data. A CNN gets its "convolutional" name based on a convolution (i.e., a mathematical operation on two functions to obtain a result) of filtering and pooling pixel data (a mathematical operation on two functions) in order to generate a predicted output (obtain a result).

Logic units within an electronic neural network (DNN or CNN) are referred to as "neurons" or "nodes". If the electronic neural network is implemented entirely in software, then each neuron/node is a separate piece of code (i.e., instructions that perform certain actions). If the electronic neural network is implemented entirely in hardware, then each neuron/node is a separate piece of hardware logic (e.g., a processor, a gate array, etc.). If the electronic neural network is implemented as a combination of hardware and software, then each neuron/node is a set of instructions and/or a piece of hardware logic.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are often only "excitatory" to varying degrees.

In an electronic neural network, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often one or more nodes for holding vector information.

Figure 3:
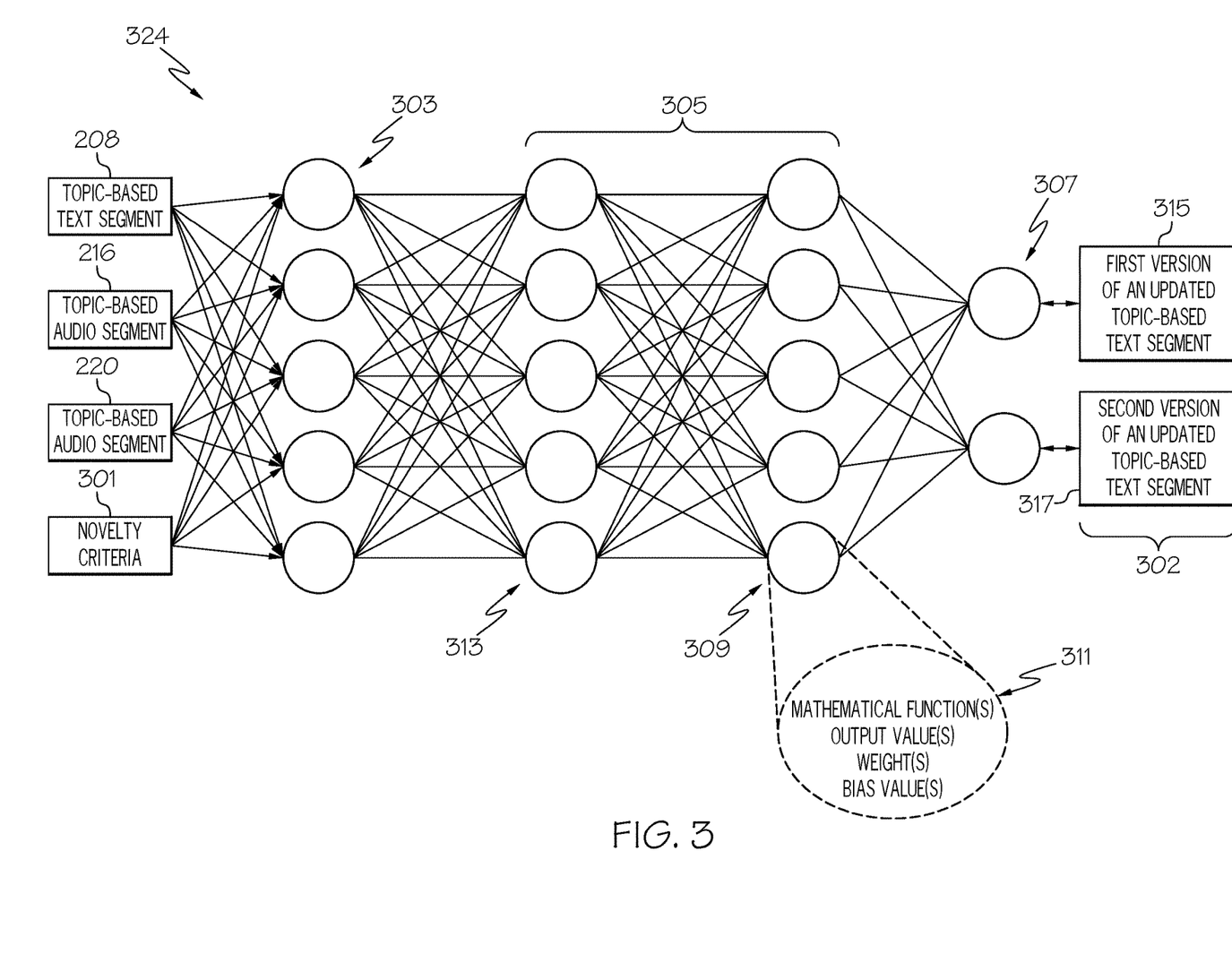
FIG. 3 depicts an exemplary deep neural network as used in one or more embodiments of the present invention.

With reference now to FIG. 3, a Deep Neural Network (DNN) 324 used to evaluate textual data (e.g., segments of text document 204 and/or segments of audio file 214 shown in FIG. 2) for purposes of updated text document segments according to one or more embodiments of the present invention is presented.

For example, assume, for illustrative purposes, that inputs into DNN 324 are topic-based text segment 208 from FIG. 2 (which refers to controlling Device B); topic-based audio segment 216 (which is a text version of words spoken by person W about how Device B should be operated/controlled); topic-based audio segment 220 (which is a text version of words spoken by Person Y about how Device B should be operated/controlled); and novelty criteria 301 (e.g., what criteria must be met in order to modify/update topic-based text segment 208). Examples of elements of the novelty criteria 301 include, but are not limited to, the common subject matter found in a particular topic-based text segment and a particular topic-based audio segment, who spoke the words found in the topic-based audio segment, the amount of difference between the content in the topic-based text segment and the topic-based audio segment, the importance of the content found in the topic-based text segment and/or the content in the topic-based audio segment, etc.

As shown in FIG. 3, the electronic neurons in DNN 324 are arranged in layers, known as the input layer 303, hidden layers 305, and an output layer 307. The input layer 303 includes neurons/nodes that take input data, and send it to a series of hidden layers of neurons (e.g., hidden layers 305), in which neurons from one layer in the hidden layers are interconnected with all neurons in a next layer in the hidden layers 305. The final layer in the hidden layers 305 then outputs a computational result to the output layer 307, which is often multiple nodes, each of which holds vector information. In an embodiment of the present invention, each neuron in the output layer 307 is associated with a particular output to output 302, as shown in FIG. 3.

In the example shown in FIG. 3, two outputs in output 302 can be generated by the DNN 324: a first version of an updated topic-based text segment 315 ("text segment 315"), and a second version of an updated topic-based text segment 317 ("text segment 317").

For example, based on the inputs shown to the input layer 303, text segment 315 can be a modified version of the topic-based text segment 208, in which source code (which is the topic-based text segment 208 in an embodiment of the present invention) for controlling operations of Device B, an operating manual (which is the topic-based text segment 208 in another embodiment of the present invention), etc. are changed to reflect changes found in the topic-based audio segment 216. Similarly, text segment 317 can be the result of changing topic-based text segment 208 with content from the topic-based audio component 220.

That is, using the operations described herein for DNN 324, the DNN 324 can determine (based on how well the novelty criteria 301 are met by the topic-based audio segment 216 versus the topic-based audio segment 220) that content from topic-based audio segment 216, or content from topic-based audio segment 220, or a combination of content from topic-based audio segment 216 and topic-based audio segment 220, is the best candidate for modifying the topic-based text segment 208.

Thus, if DNN 324 determines that who Person W is and what he/she said in the topic-based audio segment 216 is more relevant/important to the content of the topic-based text segment 208 than what Person Y said in the topic-based audio segment 220, then the topic-based text segment 208 is updated with the content of the topic-based audio segment 216. If DNN 324 determines that who Person Y is and what he/she said in the topic-based audio segment 220 is more relevant/important to the content of the topic-based text segment 208 than what Person W said in the topic-based audio segment 216, then the topic-based text segment 208 is updated with the content of the topic-based audio segment 220. However, if DNN 324 determines that Person W and Person Y are equally important, what they both say is equally relevant to the topic-based text segment 208, and what they say does not contradict one another, then the content from both the topic-based audio segment 216 and the topic-based audio segment 220 is incorporated into the topic-based text segment 208.

As mentioned above, each node in the depicted DNN 324 represents an electronic neuron, such as the depicted neuron 309. As shown in block 311, each neuron (including neuron 309) includes multiple features, such as: a mathematical function, an output value, a weight, and a bias value.

The mathematical function is a mathematic formula for processing data from one or more upstream neurons. For example, assume that one or more of the neurons depicted in the middle hidden layers 305 send data values to neuron 309. Neuron 309 then processes these data values by executing the mathematical function shown in block 311, in order to create one or more output values, which are then sent to another neuron, such as another neuron within the hidden layers 305 or a neuron in the output layer 307. Each neuron also has a weight that is specific for that neuron and/or for other connected neurons. Furthermore, the output value(s) are added to bias value(s), which increase or decrease the output value, allowing the DNN 324 to be further "fine tuned".

For example, assume that neuron 313 is sending the results of its analysis of a piece of data to neuron 309. Neuron 309 has a first weight that defines how important data coming specifically from neuron 313 is. If the data is important, then data coming from neuron 313 is weighted heavily, and/or increased by the bias value, thus causing the mathematical function (s) within neuron 309 to generate a higher output, which will have a heavier impact on neurons in the output layer 307. Similarly, if neuron 313 has been determined to be significant to the operations of neuron 309, then the weight in neuron 313 will be increased, such that neuron 309 receives a higher value for the output of the mathematical function in the neuron 313. Alternatively, the output of neuron 309 can be minimized by decreasing the weight and/or bias used to affect the output of neuron 309. These weights/biases are adjustable for one, some, or all of the neurons in the DNN 324, such that a reliable output will result from output layer 307. Such adjustments are alternatively performed manually or automatically.

When manually adjusted, the mathematical function(s), output value(s), weight(s), and/or bias value(s) are adjusted by the user in a repeated manner until the output from output layer 307 matches expectations. For example, assume that text segment 315 uses content from the topic-based audio segment 216 to update the topic-based text segment 208, while text segment 317 uses content from the topic-based audio segment 220 to update the topic-based text segment 208. Assume further that output 302 outputs updated text segments in the order in which they are more reliable/appropriate. Thus, the DNN 324 ranks, and thus outputs, text segment 315 above text segment 317, since DNN 324 has interpreted topic-based audio segment 216 to be more relevant and more important to the topic-based text segment 208 than the topic-based audio segment 220. However, assume further that a reviewer of the DNN 324 determines that keywords, the role of the speaker, etc., from topic-based audio segment 220 are actually better at meeting the novelty criteria 301 than that found in the topic-based audio segment 216. As such, the mathematical function(s), output value(s), weight(s), and/or bias value(s) shown in block 311 are manually adjusted until text segment 317 is ranked and displayed higher than text segment 315.

When automatically adjusted, the mathematical functions, output values, weights, and/or biases are adjusted using "back propagation", in which a "gradient descent" method determines how each mathematical function, output value, weight, and/or bias should be adjusted in order to provide an output 302 that is accurate. That is, the mathematical function(s), output value(s), weight(s), and/or bias value(s) shown in block 311 are recursively adjusted until text segment 317 is ranked and displayed higher than text segment 315, assuming that the novelty criteria are actually better met by the topic-based audio segment 220 than by the topic-based audio segment 216.

Figure 4:
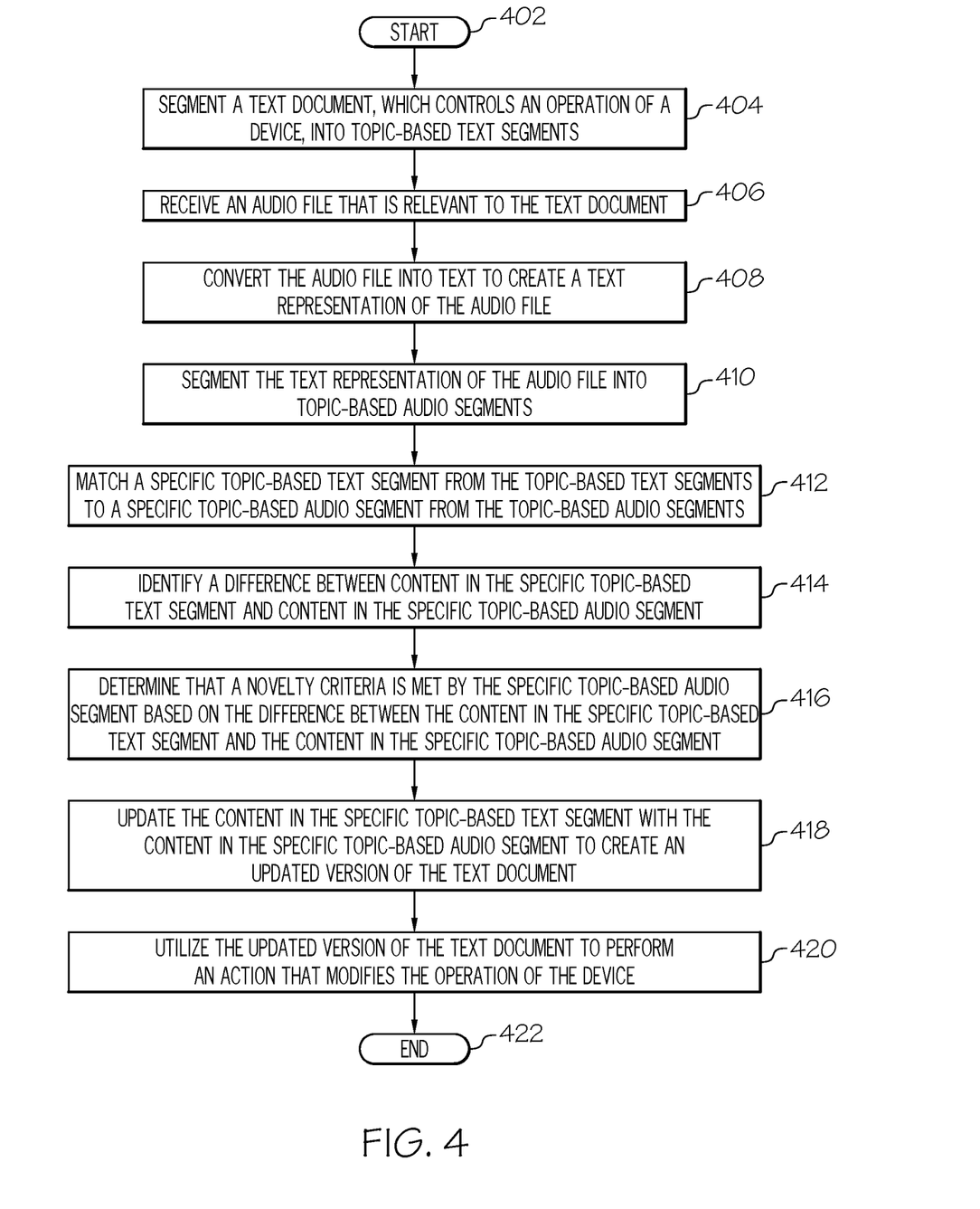
FIG. 4 is a high-level flow chart of one or more steps performed in accordance with one or more embodiments of the present invention.

With reference now to FIG. 4, a high-level flow chart of one or more steps performed in accordance with one or more embodiments of the present invention is presented.

After initiator block 402, one or more processors and/or a user segment a text document into topic-based text segments, as described in block 404. In an embodiment of the present invention, the text document controls an operation of a device. That is, the text document is source code that controls an electronic controller of the device, and/or is an operation manual for controlling the device.

As described in block 406, one or more processors (e.g., processor 104 shown in FIG. 1) receive an audio file that is relevant to the text document. For example, in FIG. 2, audio file 214 is relevant to text document 204, since they are both related to Device A and/or Device B. In an embodiment of the present invention, audio file 214 and text document 204 are deemed to be relevant to one another based on metadata associated with the audio file 214 and text document 204 (e.g., "Device A", "Device B", "operational controls", etc.), titles of the audio file 214 (e.g., "Recommended changes to Operations of Device A and Device B") and the text document 204 (e.g., "Operations of Device A and Device B"), etc.

As described in block 408, the processor(s) convert the audio file into text to create a text representation of the audio file (e.g., using a known Speech To Text—STT algorithm).

As described in block 410, the processor(s) and/or user segment the text representation of the audio file into topic-based audio segments. For example, the text version of the audio file 214 is segmented into the topic-based audio segments 216, 228, 220, 222 shown in FIG. 2 based on their content, context, keywords used, etc. in order to identify the subject/content of each of the topic-based audio segments 216, 218, 220, 222.

As described in block 412, the processor(s) and/or user match a specific topic-based text segment from the topic-based text segments to a specific topic-based audio segment from the topic-based audio segments, wherein the specific topic-based text segment from the topic-based text segments and the specific topic-based audio segment from the topic-based audio segments are of a same topic. For example, in FIG. 2 the topic of topic-based audio segment 220 is "controlling Device B", which is the same topic of topic-based text segment 208.

As described in block 414, the processor(s) and/or user identify a difference between content in the specific topic-based text segment and content in the specific topic-based audio segment. For example, even though topic-based text segment 208 and topic-based audio segment 220 are directed to the same topic of "controlling Device B", their content may different. That is, topic-based text segment 208 could state "Operate Device B at 2500 RPM", while topic-based audio segment 220 could state "Operate Device B at 2000 RPM".

As described in block 416, the processor(s) and/or user determine that novelty criteria are met by the specific topic-based audio segment based on the difference between the content in the specific topic-based text segment and the content in the specific topic-based audio segment. In the example above, "2000 RPM" is different enough from "2500 RPM" to meet this novelty (i.e., new information) criteria.

As described in block 418, in response to determining that the novelty criteria are met by the specific topic-based audio segment, the processor(s) (and/or the DNN 324 shown in FIG. 3) update the content in the specific topic-based text segment with the content in the specific topic-based audio segment to create an updated version of the text document (e.g., the first version of an updated topic-based text segment 315 shown in FIG. 3). If this update is performed by a neural network or similar artificial intelligence, then this update is performed using the process described above for DNN 324 shown in FIG. 3. If this update is performed by the processor 104 shown in FIG. 1, the generation of the first version of an updated topic-based text segment 315 shown in FIG. 3 is created by processor 104 executing a program that 1) identifies the difference between the content in the selected text/audio file segments, 2) determines that this difference is significant (e.g., changes an operation value beyond a predetermined range), and 3) updates the text segment with the new-content audio segment.

As described in block 420, the processors utilize the updated version of the text document to perform an action that modifies the operation of the device. For example, if the text document is source code, then TUUL 202 shown in FIG. 2 uses this updated version of the source code to reprogram the controller 156, in order to change the operation of the physical device 154 that is controlled by the controller 156. In the example above, then, the physical device 154 (e.g., a pump) will switch from rotating at 2000 RPM to rotating at 2500 RPM. Thus, the operation of the device is improved by performing in a manner that is optimal for a certain set of conditions.

The flow-chart ends at terminator block 422.

In an embodiment of the present invention, the audio file was generated after the text document. Thus, content of the audio file modifies the text document that is already existing.

In an embodiment of the present invention, the processor(s) apply natural language processing (NLP) to the text based representation of the audio file to identify candidate document updates for the text document. For example, assume that topic-based audio segment 216 is a text version of words spoken by Person W, in which Person W said, "I think we should speed up the rotational speed of Device B by 25%". NLP recognizes that this statement is 1) about Device B, and 2) for increasing the rotational speed of Device B by 25%. Thereafter, NLP will also evaluate topic-based text segment 208, will recognize it as 1) being about the operation of Device B, and 2) that it is currently operating at a rotational speed of 2000 RPM. As such, the system will correlate this information to increase the rotational speed of Device B to 2500 RPM in the topic-based text segment 208.

In an embodiment of the present invention, the processor(s) further determine the novelty criteria are met by the specific topic-based audio segment based on a role of a speaker who spoke the specific topic-based audio segment. That is, as discussed above, it is not only the difference in information between that found in an audio segment and a text segment that indicates that this information difference is novel (significantly different), but the role of the speaker also indicates whether this novel/different information is significant, as discussed above. That is, if a pump operator states that the rotational speed of a pump should be increased by 25%, that statement is given more credence than if a person with no technical/operational role regarding pumps states that the rotational speed of the pump should be decreased by 25%.

In an embodiment of the present invention, the processor(s) determine an importance score for the specific topic-based audio segment, where the importance score is based on a type of change that the specific topic-based audio segment makes to the text document when updating the specific topic-based text segment; and determine that the novelty criteria are met by the specific topic-based audio segment based on the importance score for the specific topic-based audio segment. For example, if Person W in FIG. 2 recommends that the rotational speed of Device B be increased by 25% (topic-based audio segment 216), while Person Y recommends that Device B be painted grey instead of white (topic-based audio segment 220), then the topic-based audio segment 216 is assigned a higher level of importance than the topic-based audio segment 220 through the use of NLP or similar logic that identifies what the speaker is talking about. Thus, the topic-based text segment 208 is modified to reflect the increase in the rotational speed of Device B to 2500 RPM, while ignoring Person Y's suggestion to paint Device B grey, since the color of the pump (Device B) does not affect its performance.

In an embodiment of the present invention, the processor(s) provide the specific topic-based audio segment to a user for feedback; responsive to receiving the feedback from the user, update the text document; and re-indexing the updated text document. That is, once the text document 204 shown in FIG. 2 is overall updated using the process described herein, it is sent to a user for approval feedback. Once the user has reviewed and approved the changes, the text document 204 is re-indexed to show, in the index, what changes have been made, and where they are located within the text document 204.

In an embodiment of the present invention, the text document is source code that, when executed by one or more processors, causes a controller of the device to perform the action that modifies the operation of the device, as describe in FIG. 1 and FIG. 2.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
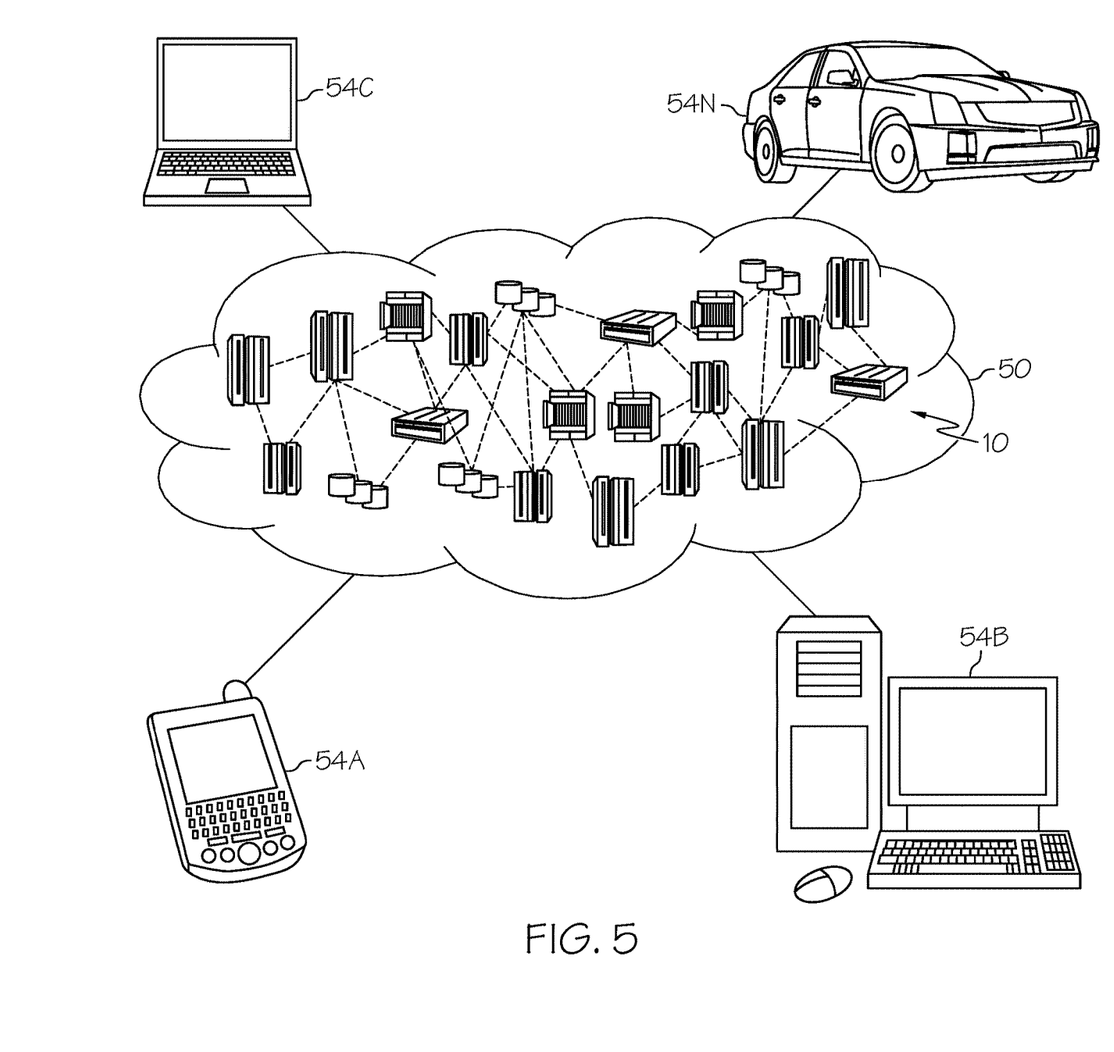
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
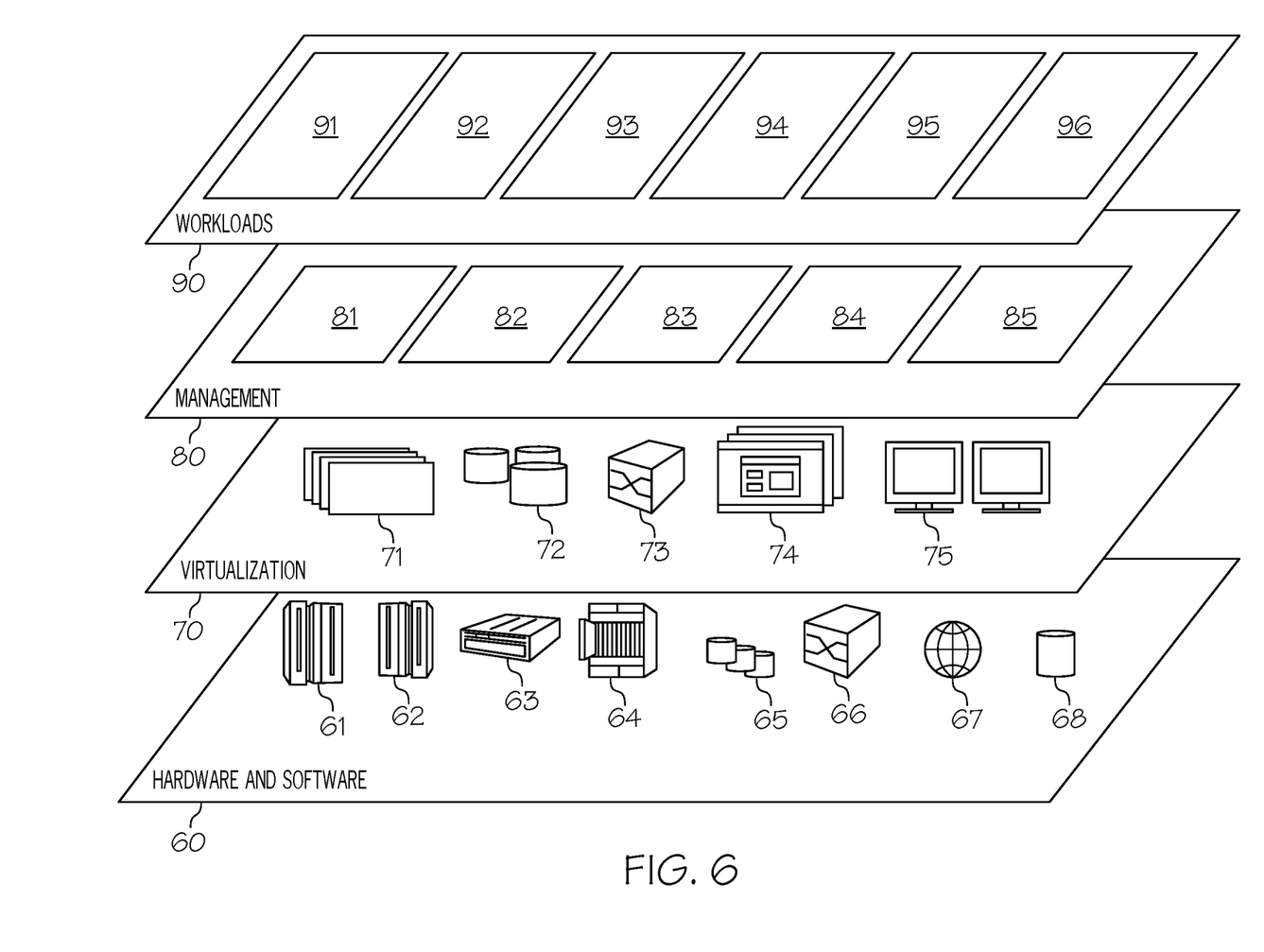
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and document updating and utilization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   segmenting a text document into topic-based text segments, wherein the text document controls an operation of a device;
   receiving, by one or more processors, an audio file that is relevant to the text document;
   converting, by one or more processors, the audio file into text to create a text representation of the audio file;
   segmenting the text representation of the audio file into topic-based audio segments;
   matching a specific topic-based text segment from the topic-based text segments to a specific topic-based audio segment from the topic-based audio segments, wherein the specific topic-based text segment from the topic-based text segments and the specific topic-based audio segment from the topic-based audio segments are of a same topic;
   identifying a difference between content in the specific topic-based text segment and content in the specific topic-based audio segment;
   determining that novelty criteria are met by the specific topic-based audio segment based on the difference between the content in the specific topic-based text segment and the content in the specific topic-based audio segment;
   in response to determining that the novelty criteria are met by the specific topic-based audio segment, updating the content in the specific topic-based text segment with the content in the specific topic-based audio segment to create an updated version of the text document; and
   utilizing the updated version of the text document to perform an action that modifies the operation of the device.

2. The method of claim 1, wherein the audio file was generated after the text document.

3. The method of claim 1, further comprising:
   applying, by one or more processors, natural language processing (NLP) to the text representation of the audio file to identify candidate document updates for the text document.

4. The method of claim 1, further comprising:
   further determining that the novelty criteria are met by the specific topic-based audio segment based on a role of a speaker who spoke the specific topic-based audio segment.

5. The method of claim 1, further comprising:
   determining an importance score for the specific topic-based audio segment, wherein the importance score is based on a type of change that the specific topic-based audio segment makes to the text document when updating the specific topic-based text segment; and
   determining that the novelty criteria are met by the specific topic-based audio segment based on the importance score for the specific topic-based audio segment.

6. The method of claim 1, further comprising:
   providing the specific topic-based audio segment to a user for feedback;
   responsive to receiving the feedback from the user, updating the text document; and
   re-indexing the updated text document.

7. The method of claim 1, wherein the text document is source code that, when executed by one or more processors, causes a controller of the device to perform the action that modifies the operation of the device.

8. A computer program product comprising a computer readable storage medium having program code embodied therewith, wherein the computer readable storage medium is not a transitory signal per se, and wherein the program code is readable and executable by a processor to perform a method comprising:
   segmenting a text document into topic-based text segments, wherein the text document controls an operation of a device;
   receiving an audio file that is relevant to the text document;
   converting the audio file into text to create a text representation of the audio file;
   segmenting the text representation of the audio file into topic-based audio segments;
   matching a specific topic-based text segment from the topic-based text segments to a specific topic-based audio segment from the topic-based audio segments, wherein the specific topic-based text segment from the topic-based text segments and the specific topic-based audio segment from the topic-based audio segments are of a same topic;
   identifying a difference between content in the specific topic-based text segment and content in the specific topic-based audio segment;
   determining that novelty criteria are met by the specific topic-based audio segment based on the difference between the content in the specific topic-based text segment and the content in the specific topic-based audio segment;

in response to determining that the novelty criteria are met by the specific topic-based audio segment, updating the content in the specific topic-based text segment with the content in the specific topic-based audio segment to create an updated version of the text document; and utilizing the updated version of the text document to perform an action that modifies the operation of the device.

9. The computer program product of claim 8, wherein the audio file was generated after the text document.

10. The computer program product of claim 8, wherein the method further comprises:

applying natural language processing (NLP) to the text representation of the audio file to identify candidate document updates for the text document.

11. The computer program product of claim 8, wherein the method further comprises:

further determining that the novelty criteria are met by the specific topic-based audio segment based on a role of a speaker who spoke the specific topic-based audio segment.

12. The computer program product of claim 8, wherein the method further comprises:

determining an importance score for the specific topic-based audio segment, wherein the importance score is based on a type of change that the specific topic-based audio segment makes to the text document when updating the specific topic-based text segment; and determining that the novelty criteria are met by the specific topic-based audio segment based on the importance score for the specific topic-based audio segment.

13. The computer program product of claim 8, wherein the method further comprises:

providing the specific topic-based audio segment to a user for feedback;

responsive to receiving the feedback from the user, updating the text document; and re-indexing the updated text document.

14. The computer program product of claim 8, wherein the text document is source code that, when executed by one or more processors, causes a controller of the device to perform the action that modifies the operation of the device.

15. The computer program product of claim 8, wherein the program code is provided as a service in a cloud environment.

16. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

segmenting a text document into topic-based text segments, wherein the text document controls an operation of a device;

receiving an audio file that is relevant to the text document;

converting the audio file into text to create a text representation of the audio file;

segmenting the text representation of the audio file into topic-based audio segments;

matching a specific topic-based text segment from the topic-based text segments to a specific topic-based audio segment from the topic-based audio segments, wherein the specific topic-based text segment from the topic-based text segments and the specific topic-based audio segment from the topic-based audio segments are of a same topic;

identifying a difference between content in the specific topic-based text segment and content in the specific topic-based audio segment;

determining that novelty criteria are met by the specific topic-based audio segment based on the difference between the content in the specific topic-based text segment and the content in the specific topic-based audio segment;

in response to determining that the novelty criteria are met by the specific topic-based audio segment, updating the content in the specific topic-based text segment with the content in the specific topic-based audio segment to create an updated version of the text document; and utilizing the updated version of the text document to perform an action that modifies the operation of the device.

17. The computer system of claim 16, wherein the audio file was generated after the text document.

18. The computer system of claim 16, wherein the method further comprises:

further determining that the novelty criteria are met by the specific topic-based audio segment based on a role of a speaker who spoke the specific topic-based audio segment.

19. The computer system of claim 16, wherein the text document is source code that, when executed by one or more processors, causes a controller of the device to perform the action that modifies the operation of the device.

20. The computer system of claim 16, wherein the stored program instructions are provided as a service in a cloud environment.

* * * * *